United States Patent [19]

Elderfield

[11] Patent Number: 5,166,815
[45] Date of Patent: Nov. 24, 1992

[54] LIQUID CRYSTAL DISPLAY AND REFLECTIVE DIFFUSER THEREFOR INCLUDING A REFLECTION CAVITY SECTION AND AN ILLUMINATION CAVITY SECTION

[75] Inventor: David V. Elderfield, Calgary, Canada

[73] Assignee: NovAtel Communications, Ltd., Calgary, Canada

[21] Appl. No.: 662,257

[22] Filed: Feb. 28, 1991

[51] Int. Cl.[5] .................. G02F 1/1335; G02F 1/1333
[52] U.S. Cl. ...................................... 359/49; 359/48; 359/83
[58] Field of Search ............... 359/48, 49, 83; 362/31, 362/297, 347

[56] References Cited

U.S. PATENT DOCUMENTS

| | | | |
|---|---|---|---|
| 3,653,138 | 4/1972 | Cooper | 359/49 |
| 4,868,563 | 9/1989 | Stair et al. | 340/825.44 |
| 4,909,604 | 3/1990 | Kobayashi et al. | 359/49 |
| 5,008,658 | 4/1991 | Russay et al. | 359/48 |
| 5,029,045 | 7/1991 | Sanai et al. | 359/49 |

Primary Examiner—William L. Sikes
Assistant Examiner—Anita Pellman Gross
Attorney, Agent, or Firm—Cesari and McKenna

[57] ABSTRACT

A diffuser for backlighting a display panel consists of a shell having a flat surface for positioning against the backside of the panel. The shell has a cavity with two sections. A reflection cavity section extending into the shell from the flat surface has highly reflective walls one of which opposite the mouth of the cavity defines a ramp. An illumination cavity section extending into the shell intercepts the reflection cavity section at a boundary near the foot of the ramp. When light propagates from the illumination cavity section into the reflection cavity section, the walls of the latter cavity section distribute that light by reflection and the ramp redirects that light to the mouth of the reflection cavity section from which the light propagates to the display panel as a uniform diffuse emanation.

17 Claims, 2 Drawing Sheets

5,166,815

LIQUID CRYSTAL DISPLAY AND REFLECTIVE DIFFUSER THEREFOR INCLUDING A REFLECTION CAVITY SECTION AND AN ILLUMINATION CAVITY SECTION

FIELD OF THE INVENTION

This invention relates to liquid crystal display. It relates especially to a reflective diffuser which takes light emitted from concentrated light sources and distributes that light evenly over a given surface area, typically onto the backlighting area of the liquid crystal display.

BACKGROUND OF THE INVENTION

Diffusers find wide-spread application in many products made by the electronics industry, for example, calculators, cellular telephones, and stereos, just to name a few. Presently, manufacturing cost and degree of reflectivity determine the commercial success of a diffuser.

FIG. 5 shows a cross section of a conventional, so-called transflective diffuser 2. This diffuser 2 is a solid, generally rectangular, clear plastic block which has a cylindrical aperture 4 formed adjacent to a front face 6 and a cavity in the underside of the block defining a ramped surface 8 extending between the aperture 4 and a back face 10. A portion of the top surface 12 located over the aperture 4 has a reflective coating 13a to prevent light emitted by light sources 16 (FIG. 4) in aperture 4 from propagating through that portion of the top surface. The ramped surface 8 is also coated with a reflective coating 13b; this coating reflects emitted light through the top surface 12 not covered by coating 13a.

FIG. 4 shows a liquid crystal display assembly that employs the transflective diffuser 2 shown in FIG. 5. The diffuser 2 is disposed on the surface of a substrate 14 so that the aperture 4 receives a pair of incandescent bulbs 16 hand soldered to the substrate surface. A color filter 18 is positioned on the diffuser top surface 12, a liquid crystal display panel 20 rests on top of the filter 18, and a cover 22 overlies the liquid crystal display panel 20. Electrical interconnects 24 and 26, which bracket diffuser 42, stand on electrical contact areas 28 on the substrate surface and provide electrical interconnections between substrate 14 and registering contacts on the underside of the liquid crystal display panel 20. Barbed tabs 29 on the cover 22 can be snapped into corresponding slots 30 in the substrate 14 to mechanically secure the components of this assembly to the substrate 14.

The light from bulbs 16 is transmitted through transflective diffuser 2 to the reflective coating 13b on the ramped surface 8 where it is reflected up to the liquid crystal display panel 20. This reflected light provides background illumination for the liquid crystal display so that the human eye can read the alphanumeric characters on the display when there is little or no ambient light present. The coating 13a of transflective diffuser 2 prevents concentrated areas of reflected light, called "hot spots", from appearing in the background of the liquid crystal display. Such hot spots, being easily discernible by the human eye, would degrade the quality of the backlighting.

The coatings 13a and 13b of diffuser 2 have largely determined the efficiency of this diffuser. That is, the degree of reflectivity of the coating is directly dependent on the quality of the coatings. The more reflective the coatings, the greater the portion of the emitted light that the diffuser will reflect up to the display panel 20, rather than refract through the walls of the diffuser. Unfortunately, the cost of coating the surfaces of the diffuser is also directly proportional to the coating reflectivity. Consequently, manufacturers have compromised by painting coatings onto the surfaces 8 and 12 which have both moderate reflectivity and cost.

The illustrated display assembly is disadvantaged also because it requires relatively intense incandescent bulbs because of light losses incurred in the transflective diffuser. In accordance with present day practice, the bulbs are soldered manually to the substrate 14. Also, since such bulbs are clear, a color filter 18 must be included to produce the required backlighting color. Both of these factors add appreciably to the overall cost of the assembly.

SUMMARY OF THE INVENTION

With the foregoing in mind, it is an object of the present invention to provide a diffuser for a liquid crystal display which has a lower manufacturing cost and higher efficiency than those of presently available diffusers.

Another object of the present invention is to provide a diffuser for a liquid crystal display which provides the display with high quality backlighting devoid of hot spots.

A further object is to provide a liquid crystal display assembly incorporating such a diffuser.

Yet another object of the present invention is to lower the cost to manufacture the liquid crystal display assemblies by eliminating the need for manually soldered incandescent bulbs and color filters in such assemblies.

These and other objects of the present invention are obtained from a so-called reflective diffuser formed as a shell of opaque material whose surfaces can be made highly reflective. At least one surface is flat so that the shell can be placed against the back side of a display panel. The shell has a cavity with two sections. A so-called reflection cavity section extends into the shell from the flat surface thereof, the mouth of the cavity section having an areal extent comparable to that of the display area in the display panel. The walls of the cavity section are highly reflective and the bottom wall extends from the flat surface toward the opposite surface of the shell to define a ramp.

The shell also includes a second cavity section, denominated an illumination cavity section, which intercepts the first or reflection cavity section near the foot of the ramp at an aperture whose nominal plane may be more or less perpendicular to the flat surface of the shell. The illumination cavity section is arranged to receive one or more light sources, preferably light emitting diodes (LEDs) which emit light of a desired color or colors.

The walls of the illumination cavity section, like those of the reflection cavity section, are made highly reflective and preferably the wall facing the reflection cavity section is ramped to reflect light emitted by the light source(s) through the aperture onto the ramped wall of the reflection cavity section. When the diffuser with its light source is in operation, the walls of the reflection cavity section distribute by reflection substantially all of the light entering that cavity and the ramped wall of the latter cavity section redirects that light to the mouth of the reflection cavity section from which the light propagates as a uniform and intense diffuse emanation to the backside of the display panel to provide high quality backlighting therefor.

Preferably, to maximize the light-emitting efficiency of the diffuser, the ramped walls of the reflection and illumination cavity section have parabolic curvature, with the focus of the former being located outside the shell opposite the mouth of the reflection cavity section and that of the latter being positioned in the shell near the aperture between the two cavity section.

Due to its unique construction, my reflective-type diffuser directs a substantially greater portion of the light emitted by the associated light source(s) to the liquid crystal display panel than does the prior transflective-type diffuser described above. Yet, even though this reflective diffuser is more efficient than the prior diffuser, it is less expensive to make because it can be molded as a unitary part using relatively little material and it requires no secondary reflective coating.

A liquid crystal display assembly employing my reflective diffuser is advantaged also in that it can use low intensity LEDs to produce the same or better backlighting intensity than is obtained from transflective diffusers. LEDs are surface mounted components which can be machine soldered, rather than hand soldered, to the substrate and they come in a variety of different colors. Therefore, their use significantly reduces the cost associated with mounting the light sources to the substrate and completely eliminates the cost of the color filters required in conventional display assemblies. The LEDs also have a significantly longer luminous life than the incandescent bulbs used heretofore in transflective diffusers which, therefore, increases the useful life of my entire liquid crystal display assembly.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
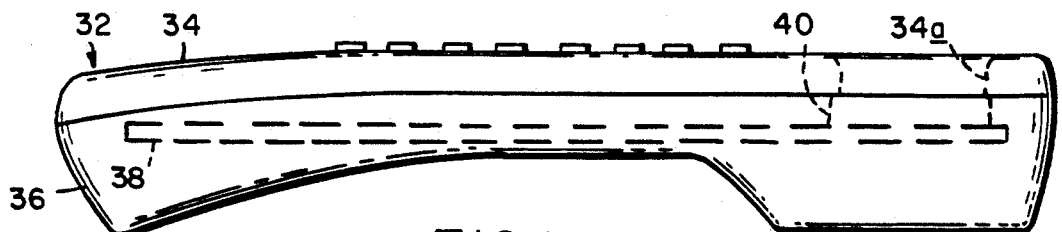
FIG. 1 is a side view of a telephone handset incorporating my liquid crystal display assembly.

FIG. 1 shows a telephone handset 32. The housing for this telephone handset 32 consists of an upper shell 34 and a lower shell 36. A printed circuit board or substrate 38 lies within the lower shell 36 of the telephone handset 32 and a liquid crystal display assembly 40 incorporating a reflective diffuser 42 (FIG. 2) is securely mounted to the printed circuit board or substrate 38. Assembly 40 produces a display which is visible through an aperture 34a in the upper shell 34.

Figure 2:
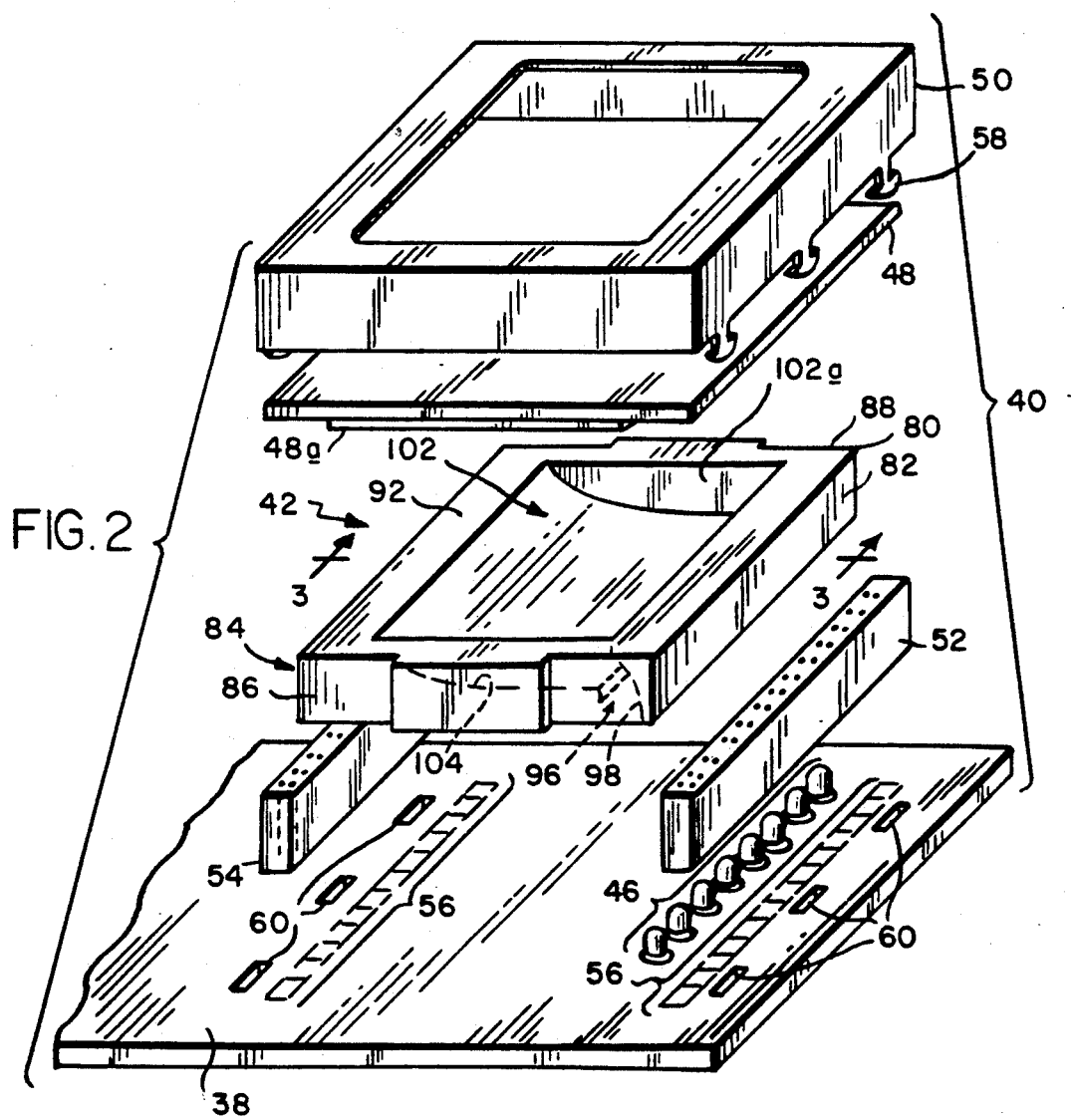
FIG. 2 is an exploded perspective view of the liquid crystal display assembly in the telephone handset shown in FIG. 1.

Referring to FIG. 2, assembly 40 comprises the reflective diffuser 42 disposed over a segment of substrate 38. A row of light-emitting diodes (LEDs) 46 machine-soldered to the substrate project up into the underside of diffuser 42 and a liquid crystal display panel 48, having a display area 48a, rests on top of the reflective diffuser 42 under aperture 34a in the handset 32. A pair of electrical interconnects 52 and 54 extend up from substrate 38 fore and aft diffuser 42, establishing electrical contacts between rows of electrical contacts 56 on the substrate surface and corresponding rows of registering contacts on the underside of liquid crystal display panel 48. Assembly 40 is topped off by an apertured cover 50 overlying panel 48 and forming a frame or bezel around display area 48a. Barbed tabs 58 projecting down from the edges of the cover 50 can be snapped into corresponding slots 60 in the substrate 38 to mechanically secure the components of this assembly to the substrate 38.

Figure 4:
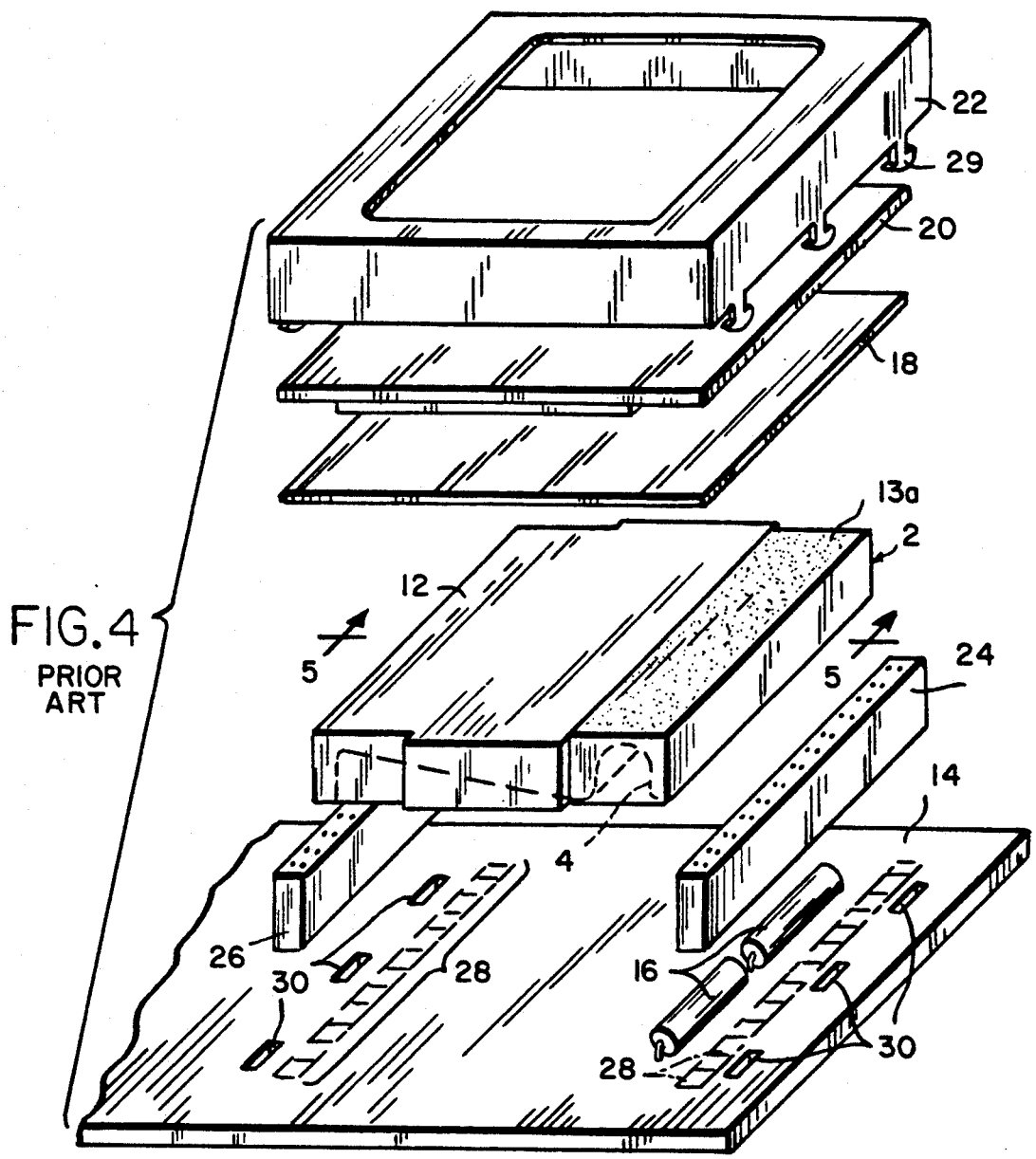
FIG. 4, already described, is an exploded perspective view of a conventional transflective liquid crystal display assembly, and FIG. 5, already described, is a sectional view taken along line 5—5 of FIG. 4.
Figure 5:
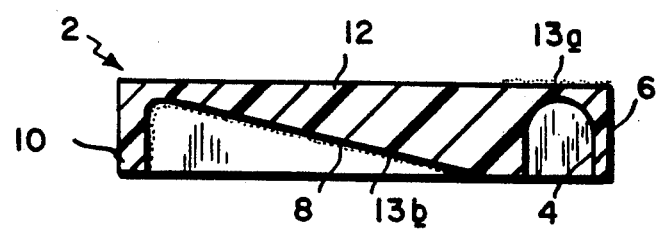

Thus, the liquid crystal display assembly 40 in FIG. 2 is quite similar to the conventional one depicted in FIGS. 4 and 5, except that the assembly 40 employs the novel reflective diffuser 42 which enables the use of machine-soldered LEDs 46 instead of manually-soldered incandescent bulbs. And, since the LEDs can be made with a wide variety of different colors, the assembly 40 no longer requires a color filter.

Figure 3:
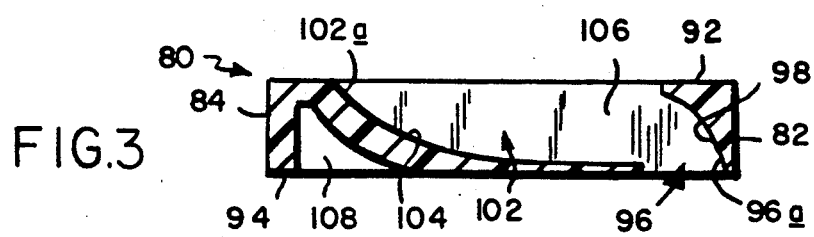
FIG. 3 is a sectional view taken along line 3—3 of FIG. 2.

Referring to FIGS. 2 and 3, diffuser 42 comprises a relatively thin, generally rectangular shell 80 having front and rear walls 82 and 84, a pair of side walls 86 and 88, and top and bottom surfaces 92 and 94. Shell 80 contains a cavity which, for convenience, we will divide into two parts or sections. The first section 96, denominated the illumination cavity section, extends in from the underside of shell 80 and has a generally rectangular mouth 96a in the bottom surface 94 of the shell. This cavity section extends between the side walls 86 and 88 of the shell with its mouth 96a being close to the shell front wall 82 and the cavity section is relatively narrow in the front-to-back direction. Cavity section 96 has a wall 98 adjacent to the shell front wall 82 which is upwardly-rearwardly curved forming a relatively wide ramped surface that extends between the side walls of the shell and faces the rear wall thereof.

A second, much larger, reflection cavity section 102 is present in shell 80 just rearwardly of cavity section 96. Cavity section 102 has a generally rectangular mouth 102a located at the flat top surface 92 of the shell, the areal extent of the mouth being comparable to that of the display area 48a of display panel 48. This reflection cavity section 102 has highly reflective walls, one of which, namely wall 104, extends downwardly and forwardly defining a curved ramp which extends from the rear edge of the reflection cavity section mouth 102a to the rear edge of the illumination cavity section mouth 96a at the underside of the shell so that the two cavity sections are next to one another in the shell. In the illustrated diffuser, the front edge of the reflection cavity section mouth 102a is located more or less directly above, and extends parallel to, the rear edge of the illumination cavity section mouth 96a. Thus, the two cavity sections meet at a boundary 106 at the foot of the ramped wall 104. The nominal plane of boundary 106 is more or less parallel to shell front and rear walls 82 and 84 and perpendicular to top and bottom surfaces 92 and 94. Also, the ramped wall 98 of the illumination cavity section faces the reflection cavity section 102 through that boundary.

The walls of both cavity sections are quite smooth and highly reflective. Preferably the ramped walls 98 and 104 of those sections have parabolic curvature, with the focus of the reflection cavity section wall 104 being located on an imaginary line located above the mouth of that cavity section and extending parallel to the front and rear edges of that cavity section and that of the wall 98 of the illumination cavity extending in the same direction between the top and bottom surfaces of the shell near the boundary 106 between the two cavities. A void 108 may be formed in the underside of shell 80 below cavity section wall 104 to reduce the weight and material cost of the diffuser.

When light sources 46 are present in the illumination cavity section 96 of the diffuser, a major portion of the light is beamed directly through the boundary 106 between the two cavity section to the highly reflective walls of the reflection cavity section 102. Those walls distribute that incident light by reflection and the curved wall 104 reflects the light upward to the mouth 102a of the illumination cavity section. The remaining light from the light sources 46 is distributed by reflection from the curved front wall 98 of the illumination cavity section 96 through the aperture 106 to the curved wall 104 of the reflection cavity section 102 where it is reflected upward to the mouth 102a of that cavity section. No light at all is transmitted through the walls of the shell 80. Therefore, substantially all of the light from the light sources 46 leaves the diffuser 42 as an upwardly directed, uniformly intense diffuse emanation from the mouth 102a of the illumination cavity section 102. Thus, when the diffuser is positioned against the backside of liquid crystal display panel 48, it provides high quality backlighting that is intense and uniform over the entire display area 48a of the panel.

The reflective diffuser 42 can be fabricated out of any opaque material capable of having highly reflective surfaces but, in this embodiment, it is made of a white polycarbonate plastic material. This diffuser is also preferably a unitary structure fabricated by a molding process.

Reflective diffuser 42 operates very simply. Light from the LEDs 46 passes directly, or is reflected by the walls of illumination cavity section 96, through the boundary 106 into reflection cavity section 102. The walls of the latter cavity section distribute and redirect substantially all of that light upwards to the underside of display area 48a of display panel 48 thereby providing relatively intense and uniform background illumination for the characters being displayed by the liquid crystal display panel 48. Since the diffuser 42 is made of an opaque material, none of the light from LEDs 46 can propagate directly to display panel 48; it must first pass through aperture 106 into reflection cavity section 102 for redirection toward the display panel. This eliminates the possibility of there being hot spots in the backlighting for the display or light loss by transmission through the sides and bottom of the diffuser.

The foregoing description has been limited to a specific embodiment of this invention. It will be apparent, however, that variations and modifications may be made to that embodiment, with the attainment of some or all of the advantages of the invention. Therefore, it is the object of the appended claims to cover all such variations and modifications as come within the true spirit and scope of the invention.

What is claimed is:

1. A diffuser for backlighting a display panel with a selected display area, said diffuser comprising:

a body of opaque material having a relatively flat surface for positioning right next to a display panel and an opposite surface;

means defining a cavity in said body, said cavity having a first section with an unobstructed mouth at said flat surface whose area is comparable to that of the display area, and highly reflective walls, at least one of which walls extend from said flat surface toward said opposite surface to define a ramp, said cavity also having a second section intercepting said first cavity section near the foot of said ramp so that when light propagates from the second cavity section into the first cavity section, the walls of the first cavity section distribute by reflection substantially all of that light and said ramp redirects that light to the mouth of the first cavity section from which the light propagates as a uniformly intense diffuse emanation directly to the display panel.

2. The diffuser defined in claim 1 wherein said body is generally rectangular with said flat and opposite surfaces constituting said top and bottom surfaces of the body;

said second cavity section has a generally rectangular mouth at said body bottom surface, and said first and second sections are next to one another in said body and intercept at a planar boundary which is generally rectangular and extends between the mouths of said first and second sections.

3. The diffuser defined in claim 2 wherein said first cavity section one wall has parabolic curvature with the focus of the curve overlying the mouth of the first cavity section.

4. The diffuser defined in claim 2 wherein said second cavity section has walls which are highly reflective, and one wall facing said first cavity section which curves upwardly-inwardly from the mouth of said second cavity section to said boundary.

5. The diffuser defined in claim 4 wherein said second cavity section one wall has parabolic curvature, with the focus of the curve being positioned between the top and bottom surfaces of the body near said boundary.

6. The diffuser defined in claim 2 wherein, said boundary is defined by walls of said cavity sections and adjacent edges of said cavity section mouths.

7. The diffuser defined in claim 1 and further including lighting means received in said second cavity section.

8. The diffuser defined in claim 7 where said lighting means comprise one or more light-emitting diodes.

9. A diffuser for backlighting a display panel with a selected display area, said diffuser comprising:

a body of opaque material consisting of a white polycarbonate plastic shell and having a relatively flat surface for positioning adjacent to a display panel and an opposite surface;

means defining a cavity in said party, said cavity having a first section with a mouth at said flat surface whose area is comparable to that of the display area, and highly reflective walls, at least one of which walls extends from said flat surface towards that opposite surface to define a ramp, said cavity also having a second section intercepting said first cavity section near the foot of said ramp so that when light propagates from the second cavity section into the first cavity section, the walls of the first cavity section, distribute by reflection substantially all of that light and said ramp redirectes that light to the mouth of said first cavity section from which the light propagates as a uniformly intense diffuse emanation.

10. A liquid crystal display assembly comprising:
a circuit board having a plurality of light sources mounted thereon;
overlying the circuit board and the light sources, a shell of opaque material, means defining a cavity in the shell, said cavity having a reflection cavity section with an unobstructed mouth at the top of the shell and a highly reflective inclined bottom surface opposite said mouth, said cavity also having an illumination cavity section with a mouth at the bottom of the shell for receiving the light sources, the illumination cavity section having a highly reflective surface facing the reflection cavity section, the boundary between the two cavity sections being at the foot of said inclined bottom surface, and a liquid crystal display panel directly overlying the unobstructed mouth of the reflection cavity section.

11. The liquid crystal display assembly of claim 10 wherein the light sources are light-emitting diodes.

12. The liquid crystal display assembly of claim 10 wherein said inclined bottom surface is curved.

13. A liquid crystal display assembly comprising a circuit board having a plurality of light sources mounted thereon; overlying the circuit board and the light sources, a shell of opaque white polycarbonate plastic material, means defining a cavity in the shell, said cavity having a reflection cavity section with a mouth at the top of the shell and a highly reflective inclined bottom surface opposite said mouth, said cavity also having an illumination cavity section with a mouth at the bottom of the shell for receiving the light sources, the illumination cavity section having a highly reflective surface facing the reflection cavity section, the boundary between the two sections being at the foot of said inclined bottom surface.

14. A liquid crystal display assembly comprising:
a substrate having light sources disposed on a substrate face;
a liquid crystal display panel disposed over the substrate;
positioned between the substrate and the display, a body of opaque material, means defining a cavity in the body, said cavity including a reflection cavity section with a highly reflective inclined bottom surface and an unobstructed mouth directly opposite the display panel, said cavity also including an illumination cavity section receiving the light sources, the illumination cavity section having a highly reflective surface facing the reflection cavity section;
housing means protectively enclosing the body and the liquid crystal display, the housing having an aperture disposed to expose at least a portion of the liquid crystal display panel, and
means for mechanically securing the housing to the substrate to secure the body and liquid crystal display panel to the substrate.

15. The liquid crystal display assembly of claim 14 wherein the light sources are light-emitting diodes.

16. The liquid crystal display assembly of claim 14 wherein the body is of a polycarbonate plastic.

17. The liquid crystal display assembly of claim 14 wherein the bottom surface of the reflection cavity section is curved.

* * * * *